United States Patent [19]

Cherry et al.

[11] Patent Number: 4,745,744

[45] Date of Patent: May 24, 1988

[54] POWER TRANSMISSION

[75] Inventors: Jeffrey P. Cherry, Rochester; Melvin A. Rode, Bloomfield; Gene Y. Wen, Troy, all of Mich.

[73] Assignee: Vickers, Incorporated, Troy, Mich.

[21] Appl. No.: 923,185

[22] Filed: Oct. 27, 1986

Related U.S. Application Data

[63] Continuation-in-part of Ser. No. 849,542, Apr. 8, 1986.

[51] Int. Cl.⁴ ............................................. F16D 31/00
[52] U.S. Cl. ...................................... 60/368; 60/420; 340/825.06; 364/513
[58] Field of Search ................... 60/368, 420; 165/22; 236/51; 91/424, 427; 414/699; 340/825.06, 825.52; 364/505, 513

[56] References Cited

U.S. PATENT DOCUMENTS

| | | | |
|---|---|---|---|
| 3,716,096 | 2/1973 | Berrett et al. | 165/22 |
| 3,978,451 | 8/1976 | Ito et al. | 340/825.05 |
| 4,151,718 | 5/1979 | Gravely, Sr. | 60/368 X |
| 4,212,078 | 7/1980 | Games et al. | 165/22 X |
| 4,593,349 | 6/1986 | Chase et al. | 340/825.06 |
| 4,622,551 | 11/1980 | Kupersmith et al. | 340/82.06 |

Primary Examiner—William E. Wayner
Attorney, Agent, or Firm—Barnes, Kisselle, Raisch, Choate, Whittemore & Hulbert

[57] ABSTRACT

An electrohydraulic system which includes a plurality of electrohydraulic devices individually controlled by microprocessor-based control electronics. A central controller for coordinating operation among the various devices includes a host controller for providing low speed serial and/or parallel output of control signals, and a master controller having a low speed serial and parallel I/O port for connection to the host controller, and a high speed serial I/O port connected by a full duplex bidirectional data bus in common to all of the device controllers.

4 Claims, 4 Drawing Sheets

Microfiche Appendix Included
(1 Microfiche, 41 Pages)

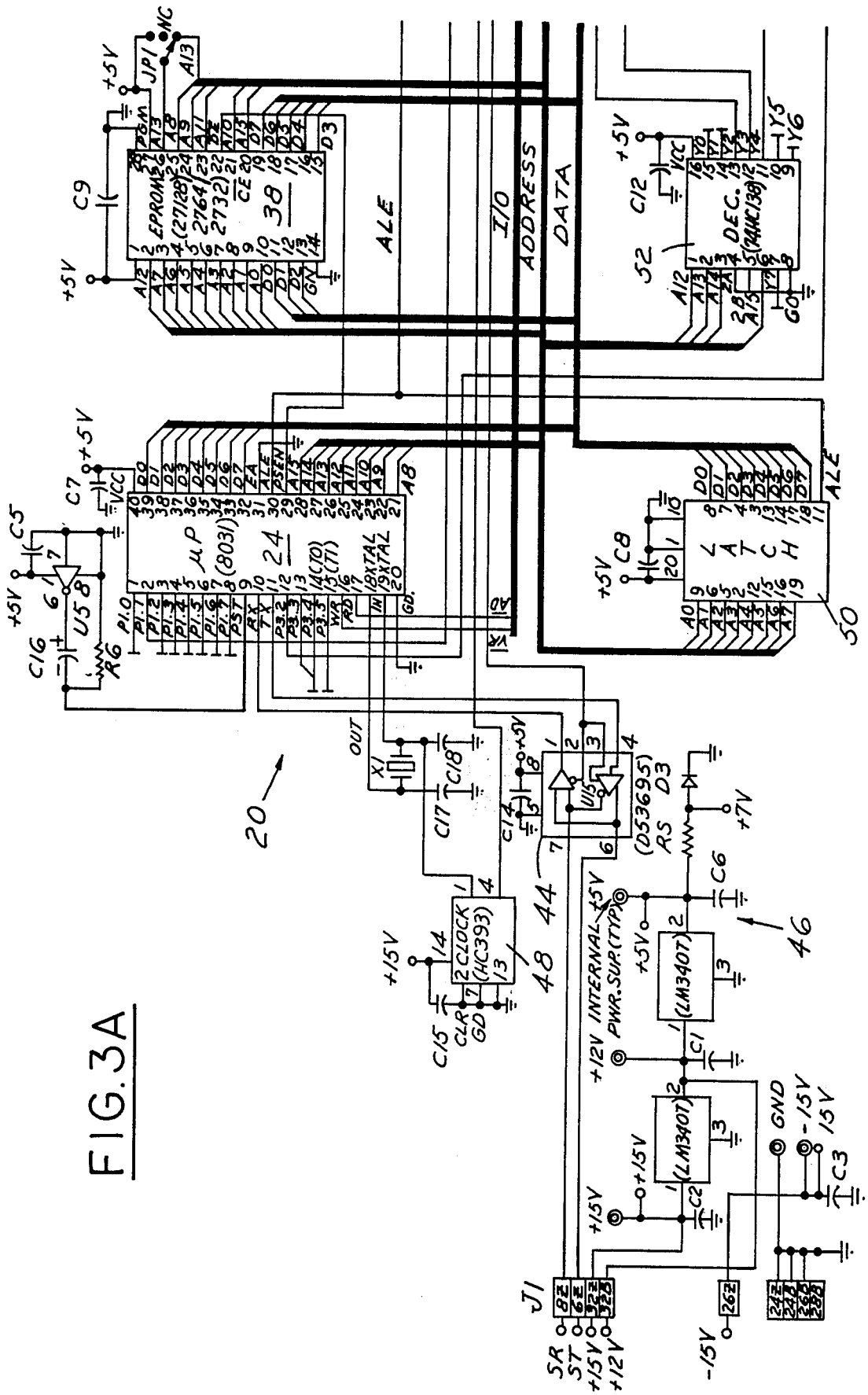

POWER TRANSMISSION

This application is a continuation-in-part of application Ser. No. 849,542, filed Apr. 8, 1986.

Reference is made to a microfiche appendix to this application consisting of one sheet of microfiche containing forty-one frames.

The present invention is directed to electrohydraulic servo systems of the type which include a plurality of electrohydraulic devices coupled to a remote central or master controller.

BACKGROUND AND OBJECTS OF THE INVENTION

In electrohydraulic systems which include a plurality of electrohydraulic devices, such as servo actuators, motors and pumps, it is conventional practice to couple all of such devices to a remote central or master controller for coordinating device operation to perform desired tasks. Motors and actuators may be employed, for example, at several coordinated stages of a machine tool line for automated transfer and machining of parts at a series of work stations. In another typical application, the moving components of an earth excavator may be coupled to electrohydraulic actuators controlled by a central controller responsive to operator lever or joystick inputs.

Conventionally, the central or master host controller may comprise a programmable logic controller or a personal computer. The host controller is coupled by digital-to-analog converters to the various remotely-positioned electrohydraulic devices through low speed serial or parallel input/output (I/O) ports for supplying control signals thereto. For closed-loop operation a sensor is positioned at each eletrohydraulic device for sensing operation thereof, and feeds a corresponding sensor signal to the remote central controller through an analog-to-digital converter, appropriate signal conditioner and the same low speed I/O port.

Thus, in a system which embodies a plurality of electrohydraulic devices, a substantial quantity of electrical conductors must be provided for feeding individual control signals to the various devices and returning sensor signals to the central controller. Such conductors interfere with system design and operation, and are subject to failure, adding to the expense and complexity of the overall system. Furthermore, low speed serial or parallel I/O between the central host controller and the various device controllers severely limits speed of operation.

It is therefore a general object of the present invention to provide an electrohydraulic servo system which exhibits reduced cost and complexity as compared with prior art systems of the character described. In furtherance of the foregoing, a more specific object of the invention is to provide a system of the described character wherein each of the system electrohydraulic devices is controlled by a dedicated local microprocessor-based controller adapted to communicate with a high speed central controller over a common data bus for thereby distributing control of the several electrohydraulic devices and reducing interconnection cost and complexity while maintaining overall system coordination and speed capabilities.

SUMMARY OF THE INVENTION

In accordance with the present invention, an electrohydraulic servo control system, which includes a plurality of electrohydraulic devices coupled to a remote central controller, is characterized in that the central controller comprises the conventional host controller for generating and transmitting control signals through a low speed I/O port, and a master controller which includes a low speed I/O port for coupling to the host controller to receive such control signals, a non-volatile memory for storing the control signals, and a high speed serial I/O port for communicating such stored control signals to the individual device controllers. All of the device controllers are connected in common by a high speed serial I/O bus to the high speed I/O port of the master controller. The device controllers include facility for individually addressed communication with the master controller. In the preferred embodiment of the invention, the low speed I/O port of the master controller includes an RS232 serial communications port, and the high speed I/O port of the master controller comprises an RS485 serial communications port.

BRIEF DESCRIPTION OF THE DRAWINGS

The invention, together with additional objects, features and advantages thereof, will be best understood from the following description, the appended claims and the accompanying drawings in which:

FIGS. 3A and 3B together comprise an electrical schematic drawing of the master controller illustrated in block form in FIGS. 1 and 2.

DETAILED DESCRIPTION OF PREFERRED EMBODIMENTS

Figure 1:
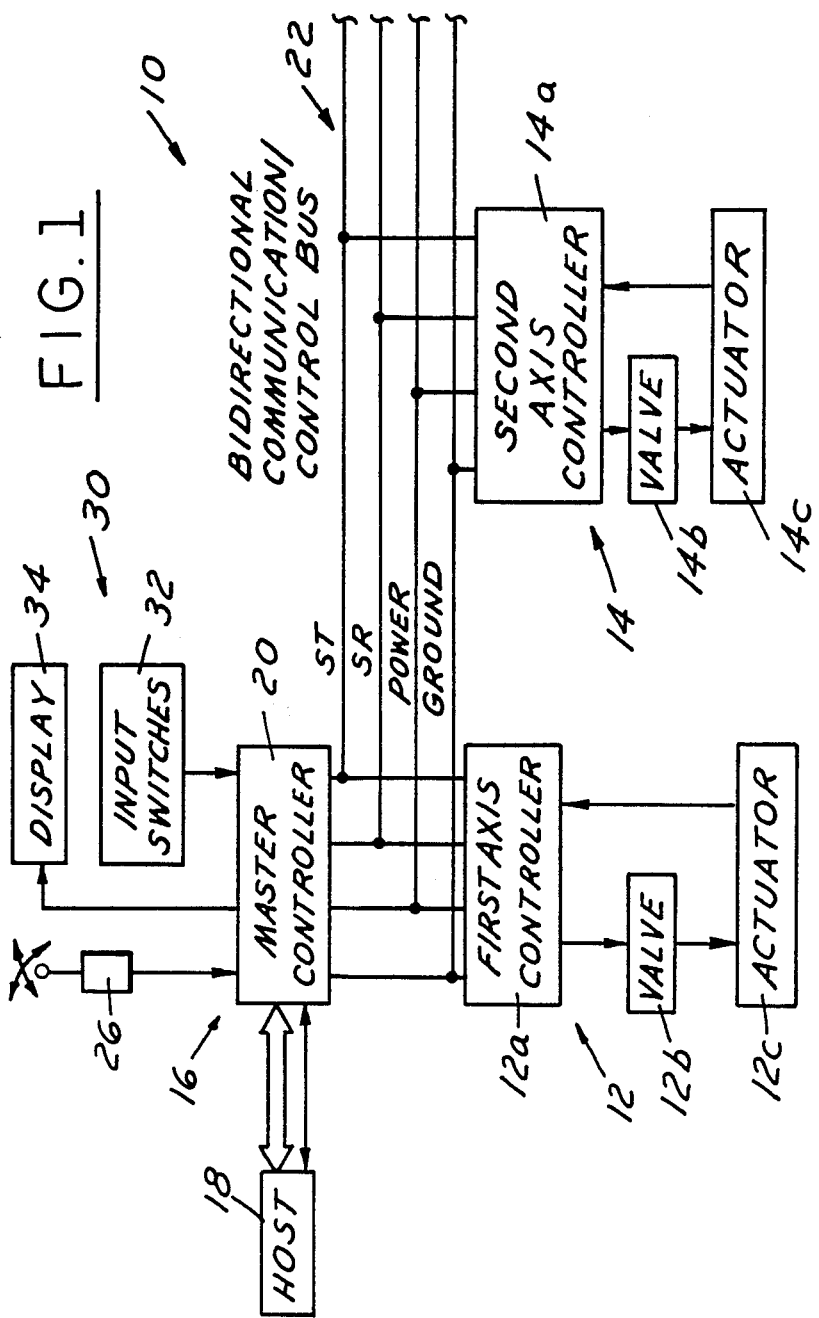
FIG. 1 is a fragmentary functional block diagram of and electrohydraulic control system in accordance with the principles of the present invention.

FIG. 1 is a fragmentary functional block diagram of an electrohydraulic system 10 in accordance with the present invention which comprises a plurality of electrohydraulic devices 12, 14, etc. for performing hydraulic operations about associated axes, and a central controller 16 for providing control signals to the devices 12, 14. Each of the electrohydraulic devices 12, 14 includes an associated dedicated controller 12a, 14a coupled through an electrohydraulic servo valve 12b, 14b to an associated hydraulic actuator 12c, 14c. A sensor feeds signals indicative of actuator position back to the controller. In a preferred implementation of the invention, controller 12a and valve 12b, as well as controller 14a and valve 14b, each comprise a combined servo valve and controller assembly as disclosed in U.S. application Ser. No. 849,540, filed Apr. 8, 1986, which is incorporated by reference for details of construction.

Central controller 16 includes a host controller 18, which may comprise any conventional programmable logic controller, personal computer or the like having stored therein all of the necessary information for controlling operation of the various axis controllers, and corresponding valves and actuators, through serial and-/or parallel I/O ports. In accordance with the present invention, a master controller 20 (FIGS. 1–3B) is coupled between host controller 18 and the various axis or device controllers for receiving and storing control information from host controller 18 through the latter's low speed serial and/or parallel I/O port, and for communicating such control information to the various axis controllers along the high speed serial data bus 22. Full duplex high speed serial communication per se between master controller 20 and device controllers 12a, 14a, etc. along high speed serial data bus 22 is the subject of parent application Ser. No. 849,542, which is incorporated by reference for details.

Figure 2:
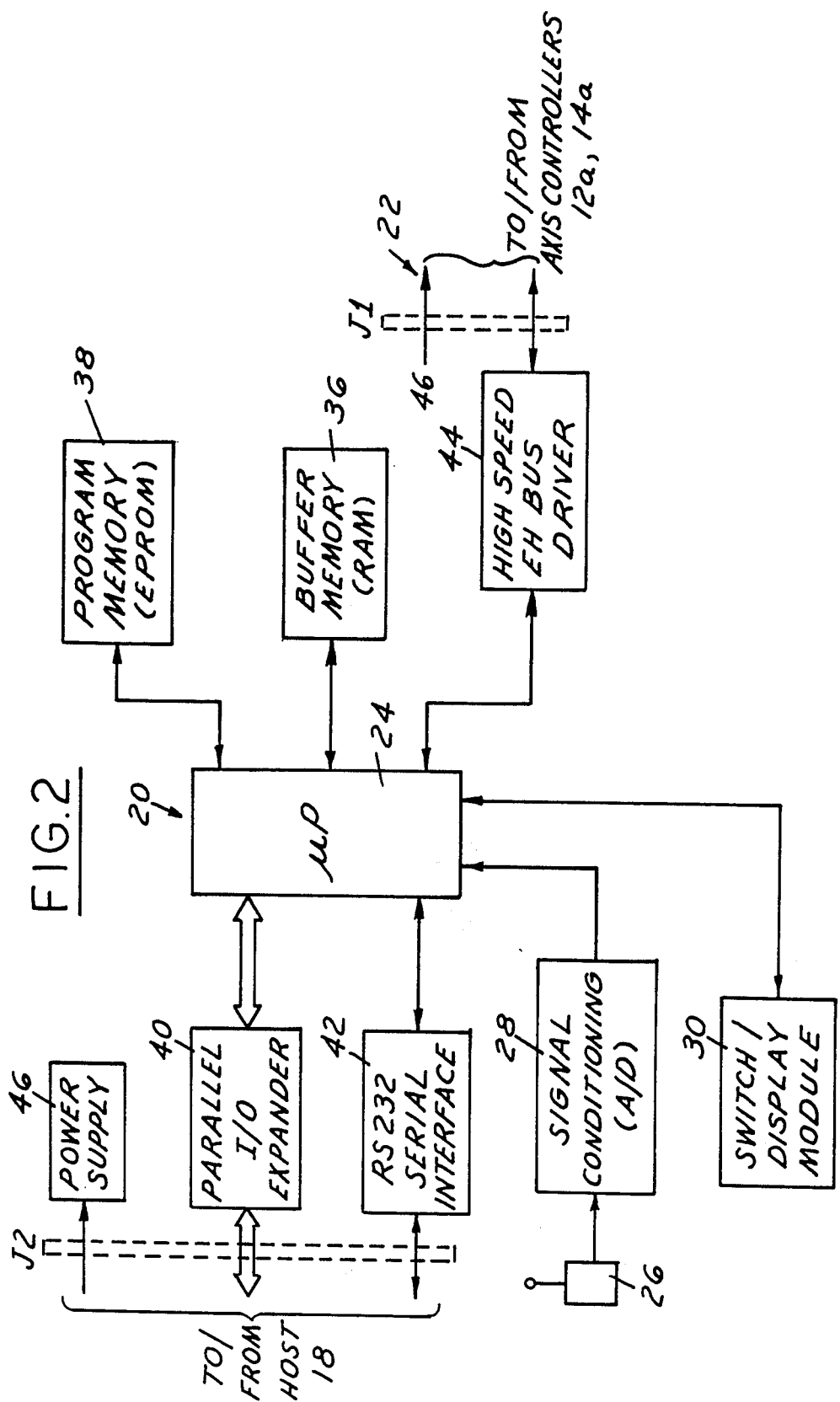
FIG. 2 is a functional block diagram of the master controller of FIG. 1.

Referring to FIGS. 1 and 2, master controller 20 includes a microprocessor 24 adapted to receive manual operator inputs from a joystick 26 or the like through an a/d converter or other suitable signal conditioning circuitry 28. Microprocessor 24 also communicates with a display/switch module 30 which includes switches 32 (FIG. 1) for selective input or modification of system parameters by the operator, and a display 34 for indicating system status and operation to the operator. Microprocessor 24 is also interconnected with a non-volatile buffer memory 36 for storing parameters and control information required by the control devices, and to a read-only-memory 38 for storing system operating programs. Microprocessor 24 is coupled to a low speed I/O port at connector J2. The low speed I/O port includes a parallel I/O interface 40 and a RS232 serial I/O interface 42. A high speed serial I/O interface and driver 44 couples master controller microprocessor 24 to axis controllers 12a, 14a at connector J1 through an RS485 port and serial bus 22. A power supply 46 receives input power from host controller 18 through connector J2, and provides power to axis controllers 12a, 14a, etc. through connector J1 and bus 22. Thus, in the event of electrical power failure, power is removed from the master and device controllers. However, all programming in both the master and device controllers is stored in non-volatile memory, such as memory 38 in FIG. 2.

Figure 3B:
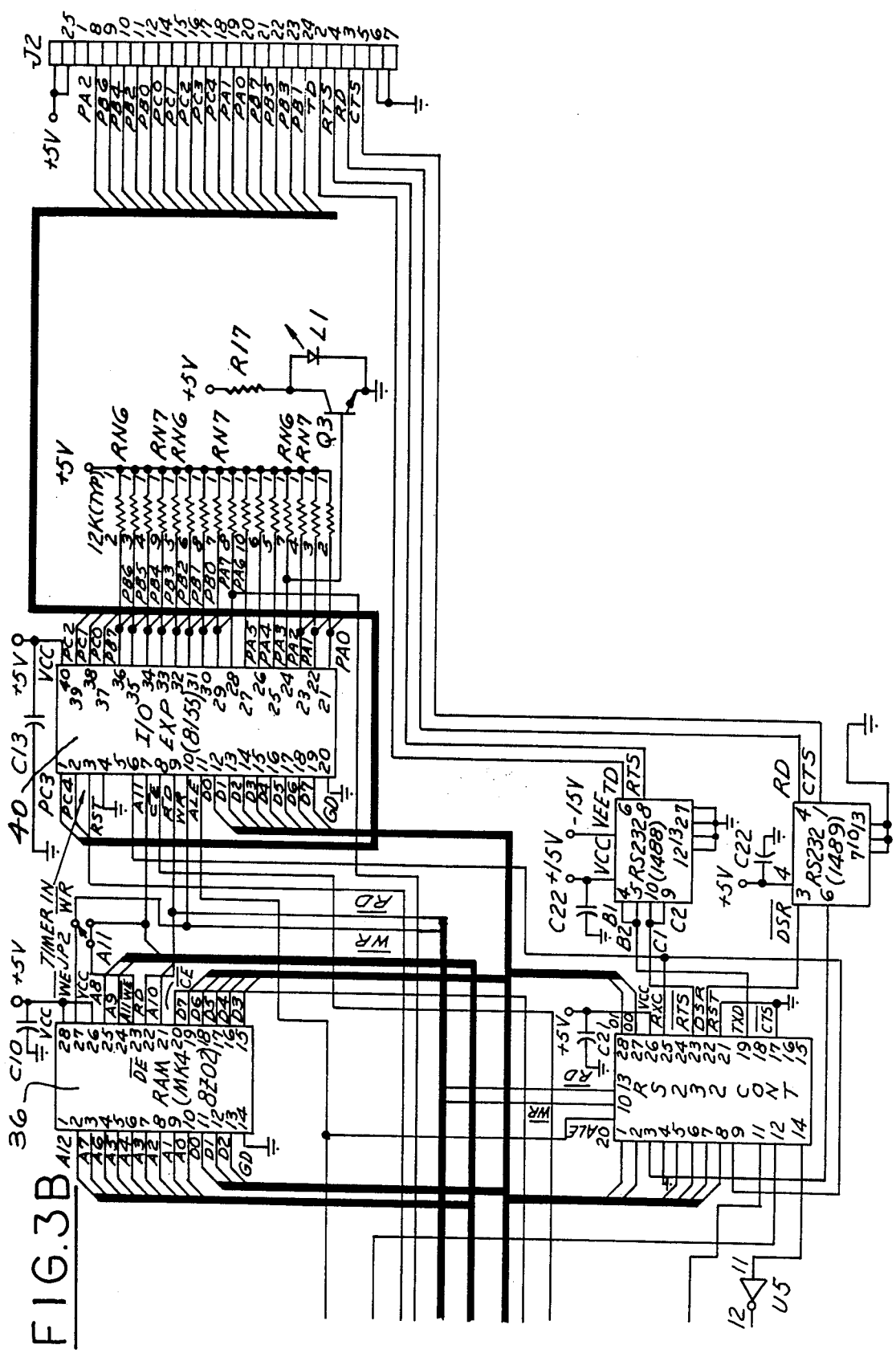

FIGS. 3A and 3B together comprise an electrical schematic drawing of master controller 20 illustrated in block form in FIG. 2. The major integrated circuit components in FIGS. 3A and 3B bear standard component identifications in parentheses, such identifications being by way of example only. The major integrated circuit components of FIGS. 3A and 3B are also identified by reference numerals corresponding to those employed in FIG. 2, with the exception of clock 48 (FIG. 3A) latch 50 and decoder 52 which are connected to microprocessor 24 and memories 36, 38 in the usual manner. Exemplary software in Intel assembly code for use in conjunction with microprocessor 24 to implement communications with host controller 18 and device controllers 12a, 14a, etc. as hereinabove described accompanies this specification as a microfiche appendix.

In general master controller 20 operates by first downloading command information from host 18, such as axis position command profiles, and stores such information in buffer memory. Information so stored is then recalled and transmitted to the axis controller, where position profile information is stored and employed to coordinate axis motions. Status information from the axis controller is received at high speed, stored in buffer memory, and then retransmitted to the host controller.

The invention claimed is:

1. An electrohydraulic system with distributed control comprising
   a plurality of electrohydraulic devices responsive to electronic control signals for performing hydraulic operations and control means for providing said control signals, said control means including a plurality of individual device control means each associated with and dedicated to directly controlling operation at an associated electrohydraulic device, central control means, and means coupling said central control means to all of said device control means for coordinating operation of said electrohydraulic devices controlled thereby,
   characterized in that said central control means comprises host control means for generating control signals for said device control means to coordinate operation thereof and having a low speed I/O port for communicating said control signals, and master control means including a low speed I/O port for coupling to said host control means to receive said control signals, means for storing said control signals, and a high speed serial I/O port for communicating said control signals, and
   in that said coupling means comprises a high speed serial I/O bus coupled to said high speed serial I/O port and common to all of said device control means, said device control means being constructed for connection to said common bus for individual communication with said master control means.

2. The system set forth in claim 1 wherein said low speed I/O port comprises separate low speed parallel and serial I/O ports.

3. The system set forth in claim 2 wherein said low speed I/O port comprises an RS232 port, and wherein said high speed I/O port comprises an RS485 port.

4. The system set forth in claim 1 wherein said means for storing said control signals comprises a non-volatile memory.

* * * * *